US000001947H

(19) United States

(12) Statutory Invention Registration (10) Reg. No.: US H1947 H

Starrett (43) Published: Mar. 6, 2001

(54) EXPANDABLE POLICE BATON

(75) Inventor: Paul D. Starrett, Jaffrey, NH (US)

(73) Assignee: Monadnock Lifetime Products, Inc., Fitzwilliam, NH (US)

(21) Appl. No.: 08/554,401

(22) Filed: Nov. 6, 1995

Related U.S. Application Data

(63) Continuation of application No. 08/230,399, filed on Apr. 20, 1994, now abandoned.

(51) Int. Cl.[7] ..... F41B 15/02

(52) U.S. Cl. ..... 463/47.7; 135/75

(58) Field of Search ..... 273/84 R, 84 ES, 273/800; 403/108, 109, 377; 16/115; 285/298, 299, 300, 301; 135/75, 107, 108

(56) References Cited

U.S. PATENT DOCUMENTS

| | | | | |
|---|---|---|---|---|
| 27,335 | | 2/1860 | Rowe . | |
| 116,097 | | 6/1871 | Reichard . | |
| 365,644 | | 6/1887 | Smith . | |
| 1,716,131 | | 6/1929 | Hodgson . | |
| 2,911,985 | | 11/1959 | Granrath . | |
| 2,980,456 | | 4/1961 | McMullin . | |
| 2,989,968 | | 6/1961 | Vogel . | |
| 3,371,930 | | 3/1968 | Shiga . | |
| 3,589,350 | * | 6/1971 | Hoyt et al. | 273/80 D |
| 3,712,652 | | 1/1973 | Uilkema . | |
| 3,833,012 | * | 9/1974 | McAllister | 273/80 D |
| 4,037,839 | | 7/1977 | Nelson . | |
| 4,466,152 | * | 8/1984 | Moss et al. | 16/115 |
| 4,752,072 | | 6/1988 | Parsons . | |
| 4,819,137 | | 4/1989 | Hamilton . | |
| 4,896,687 | * | 1/1990 | Segal et al. | 403/109 |
| 4,964,636 | | 10/1990 | Ashihara . | |
| 5,041,951 | | 8/1991 | Fan . | |
| 5,108,097 | | 4/1992 | Ashihara . | |
| 5,110,375 | | 5/1992 | Parsons . | |
| 5,149,092 | | 9/1992 | Parsons . | |
| 5,160,140 | | 11/1992 | Starrett . | |
| 5,188,362 | | 2/1993 | Ashihara . | |
| 5,320,348 | * | 6/1994 | Starrett | 273/84 R |

FOREIGN PATENT DOCUMENTS

| | | |
|---|---|---|
| 543517 | 6/1957 | (CA) . |
| 2-40499 | 2/1990 | (JP) . |

OTHER PUBLICATIONS

Brochure—F. Morton Pitt Co., regarding Titan Tape from about 1968–1969.

* cited by examiner

*Primary Examiner*—Harold J. Tudor

(74) *Attorney, Agent, or Firm*—Ernest V. Linek, Esq.; Dike, Bronstein, Roberts and Cushman, LLP

(57) ABSTRACT

A multiple section telescoping police baton is disclosed. The baton has a locking mechanism which is activated upon twisting of one section relative to the other in order to prevent sliding motion of one section relative to the other.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EXPANDABLE POLICE BATON

This is a continuation of application Ser. No. 08/230,399 filed on Apr. 20, 1994, now abandoned.

BACKGROUND OF THE INVENTION

The use of expandable police baton e.g. constructed of metal and plastic have found wide acceptance.

Such police batons are e.g. shown in U.S. Pat. No. 5,160,140 and U.S. application Ser. No. 08/016,680 filed Feb. 11, 1993 (issue fee paid).

U.S. application Ser. No. 08/016,680 discloses a police baton sold in the USA more than one year prior to this application.

BRIEF DESCRIPTION OF THE DRAWINGS

The present invention is directed to a new and improved expandable police baton (club) of e.g. three sections, each successive one being narrower diameter than the other and which includes in each successively narrower in diameter section, there is connected for rotary motion an off center axis mounted locking member to prevent the narrower in diameter section from collapsing into the larger diameter section until released by the user.

The baton sections in effect move from a telescoped relationship to an expanded relationship when in use and can be locked in place to form the police baton.

BRIEF DESCRIPTION OF THE DRAWINGS

Figure 1:
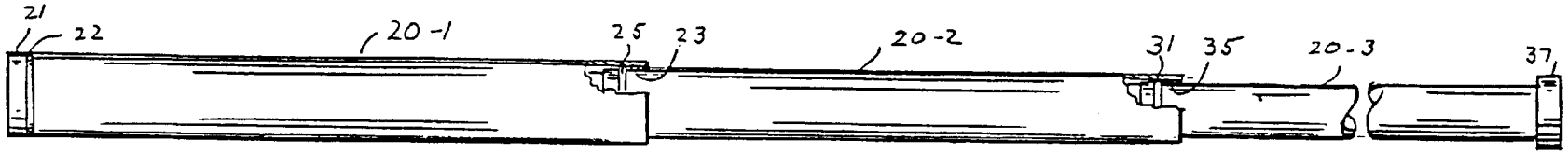
Figure 2:
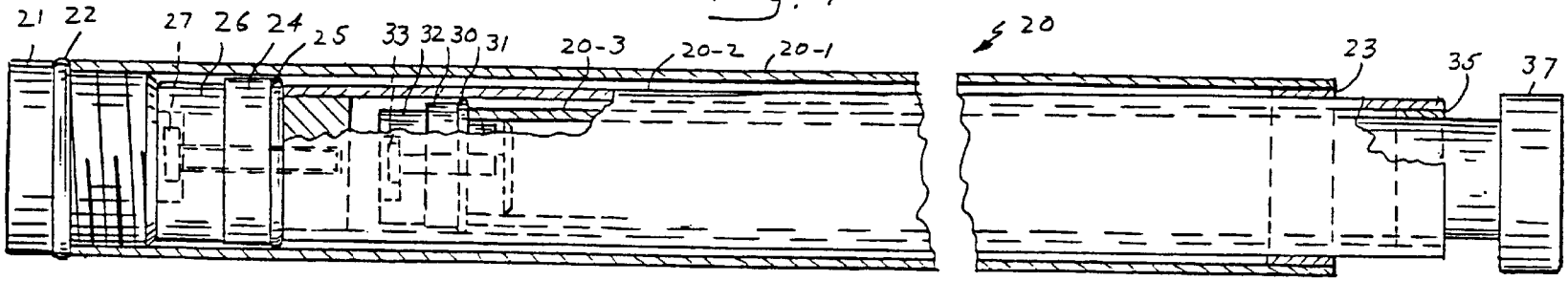
Figure 5:
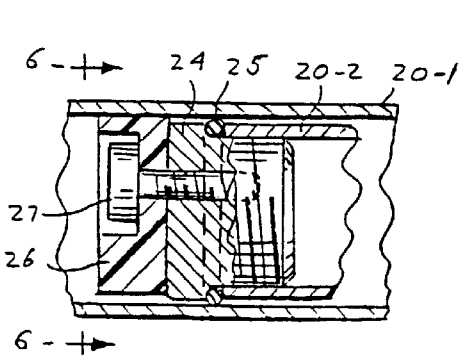
Figure 6:
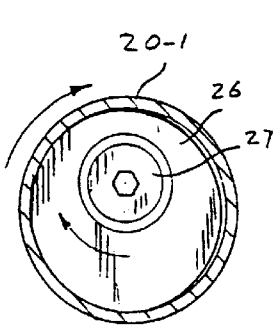
Figure 3:
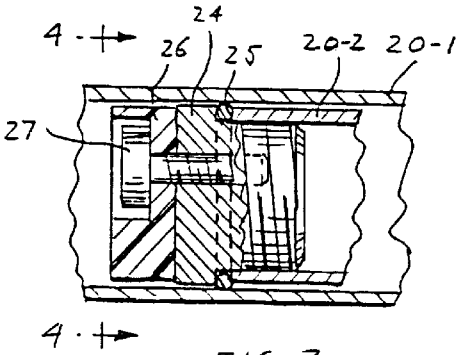
Figure 4:
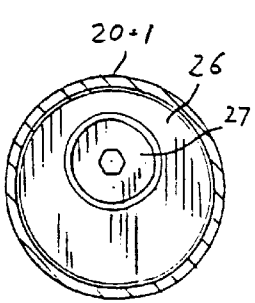

FIG. 1 is a plan view partially in section of the baton of this application in an expanded state;

FIG. 2 is a partial sectional view of the baton of this application in a telescoped state;

FIG. 3 is a sectional view of a portion of FIG. 2;

FIG. 4 is a view taken along line 4—4 in FIG. 3;

FIG. 5 is a sectional view of a portion FIG. 1 showing one baton section locked in place to the section into which it telescopes; and FIG. 6 is a view taken along line 6—6 in FIG. 5.

DETAILED DESCRIPTION OF THE INVENTION

Reference should now be had to FIGS. 1–6 which show a three section police baton at 20.

The baton 20 comprises a first section 20-1, a second section 20-2 and a third section 20-3, each section progressively smaller in diameter. The first and second sections are at least partially hollow. The third section while shown hollow need not be hollow since it slides i.e. telescopes into the second section.

There is provided a threaded plug 21 connected to the first section and over which there is provided a rubber O-ring 22. The first section 20-1 is also provided with a threaded ring 23 which acts as a stop to the second section 20-2.

The second section 20-2 is provided with a threaded plug 24 with a rubber O-ring 25 positioned between a shoulder of the plug 24 and the second section 20-2. Attached to plug 24 is an offset mounted cam 26 of brake pad like composition (e.g. a polyurethane shore 90 hardness is suitable) fastened for rotation to the plug 24 by a threaded bolt 27.

The third section 20-3 also is provided with a locking mechanism including a plug 30, O-ring 31, an offset mounted cam 32 and a bolt 33. The cam 32 is also of the same brake pad like material.

When the second section 20-2 is rotated (twisted) relative to the first section 20-1, the sections 20-2 and 20-1 lock together and prevent horizontal telescoping movement. FIG. 3 particularly shows e.g. the locking cam 26 in the position which permits horizontal (back and forth) motion of section 20-2 relative to section 20-1.

FIG. 4 illustrates the cam 26 engaging the inner hollow wall of the section 20-1 after section 20-2 was twisted (rotated) relative to section 20-1 to cause the plug to rotate and cause the cam to move towards and press against the inner wall of the section 20-1. The cam 32 also operates in the same manner as the cam 26 when the section 20-3 is rotated relative to the section 20-2. At 37 there is provided a threaded ball tip which is larger in diameter than the section 20-3.

In putting the baton together, each section is successively slid into one another with the end cap 21 at one end and the ball tip 37 at the other end. Each of the plugs 24 and 30 are larger in diameter than the section 20-2 and 20-3 to which they are respectively coupled.

When the baton is in the extended position, the O-rings 25 and 31 and the respective sections 20-2 and 20-3 engage threaded rings 23 and 35 respectively to retain the sections at least partially within the supporting section as shown in FIG. 1.

To lock the baton in place, the first and third sections 20-1 and 20-3 respectively are counter rotated quickly in either direction.

This engages the cam's, pressing them tightly against the inside wall of the previous section.

Centrifugal force causes the off center mounted cams to be thrown outwardly and catch on the inside surface of the respective section.

To release the baton thereby positioning the sections as in FIG. 2, counter rotate the first and third sections opposite the way it was locked until the cams 26 and 32 release. Then the baton sections can be moved to the closed position as in FIG. 1. To keep the baton in the closed position, gently rotate the third section 20-3 until pressure is felt to keep the baton in the closed position.

What is claimed is:

1. A police baton comprising first, second and third sections, adapted to be drawn out from a telescoped relationship to an extended relationship, said first section supporting said second section, and said second section supporting said third section and first and second means supported respectively by said second and third sections which upon rotation of said sections relative to the section within which they are at least partially positioned in at least one direction can cause the second section to lock in said first section and said third section to lock in said second section whereby motion of said each section relative to another is inhibited.

2. The police baton according to claim 1 in which said first and second means comprises a cam which is off center mounted to said respective section.

3. The police baton according to claim 2 in which said first and second sections are hollow.

4. The police baton according to claim 3 in which said first and second means support bumper means which engage stopping means positioned on the first and second section when said baton is fully extended.

5. A police baton comprising first and second sections, at least said first section being hollow and supporting said second section for translational motion therein, means for preventing said second section from falling out of said first section, and means for locking said first and second sections together to inhibit translational motion, said means comprising a cam which is offset mounted to said second section so that rotation of one section with respect to the other can cause off center mounted cam to move in a direction to engage the interior of the hollow first section.

6. The police baton according to claim 5 in which first section has plug means for limiting the movement of said second section within said first section.

* * * * *